United States Patent

Ridler et al.

[11] 4,023,130
[45] May 10, 1977

[54] PIVOTED ARM CONTROL ARRANGEMENTS

[75] Inventors: Keith Douglas Ridler, Cambridge; Gordon Malcolm Edge, Saffron Walden; Robert Charles Whelan, Comberton, all of England

[73] Assignee: Strathearn Audio Limited, Belfast, Northern Ireland

[22] Filed: Apr. 24, 1975

[21] Appl. No.: 571,432

[30] Foreign Application Priority Data

Apr. 30, 1974 United Kingdom ............ 18841/74

[52] U.S. Cl. .................. 335/219; 274/1 R; 274/23 R; 335/180
[51] Int. Cl.² ....................... H01F 7/00; G11B 3/10
[58] Field of Search .......... 335/180, 220, 219, 302, 335/306, 229, 230, 234; 274/23 R, 1 R

[56] References Cited

UNITED STATES PATENTS

| 3,221,120 | 11/1965 | Mooney et al. ............ 335/180 |
| 3,623,734 | 11/1971 | Sakamoto et al. ......... 274/23 R |
| 3,775,714 | 11/1973 | Heuer ........................ 335/234 |
| 3,830,505 | 8/1974 | Rabinow .................... 274/23 R |

FOREIGN PATENTS OR APPLICATIONS

| 1,013,285 | 7/1952 | France ....................... 274/1 R |
| 824,705 | 1/1952 | Germany .................... 274/1 R |
| 641,006 | 12/1936 | Germany .................... 274/1 R |

*Primary Examiner*—Harold Broome
*Attorney, Agent, or Firm*—Cesari and McKenna

[57] ABSTRACT

The vertical movement of a phonograph pick-up arm is controlled magnetically or electro-magnetically by means including a body of magnetic material attached to the arm and magnetic field producing means arranged to exert a force on the body.

7 Claims, 8 Drawing Figures

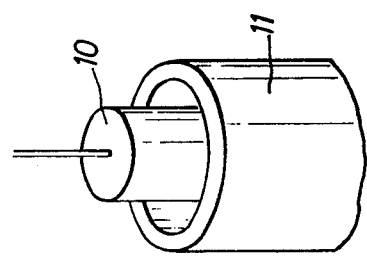
FIG. 3.
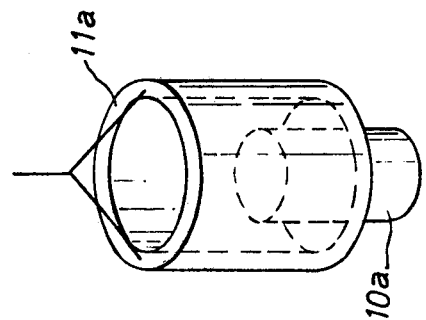
FIG. 4.
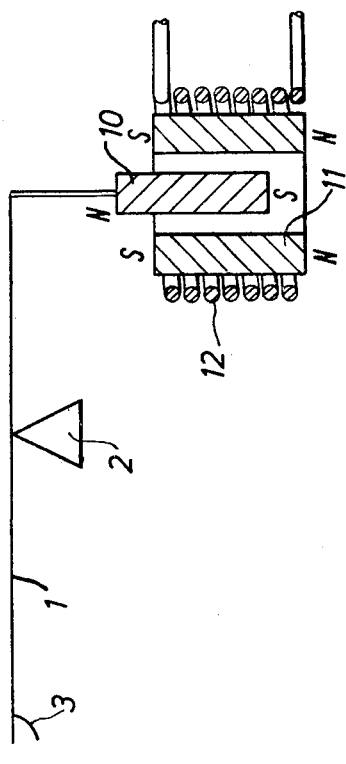
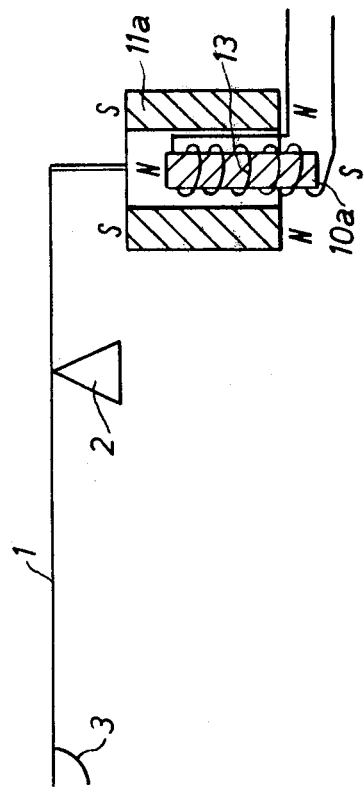

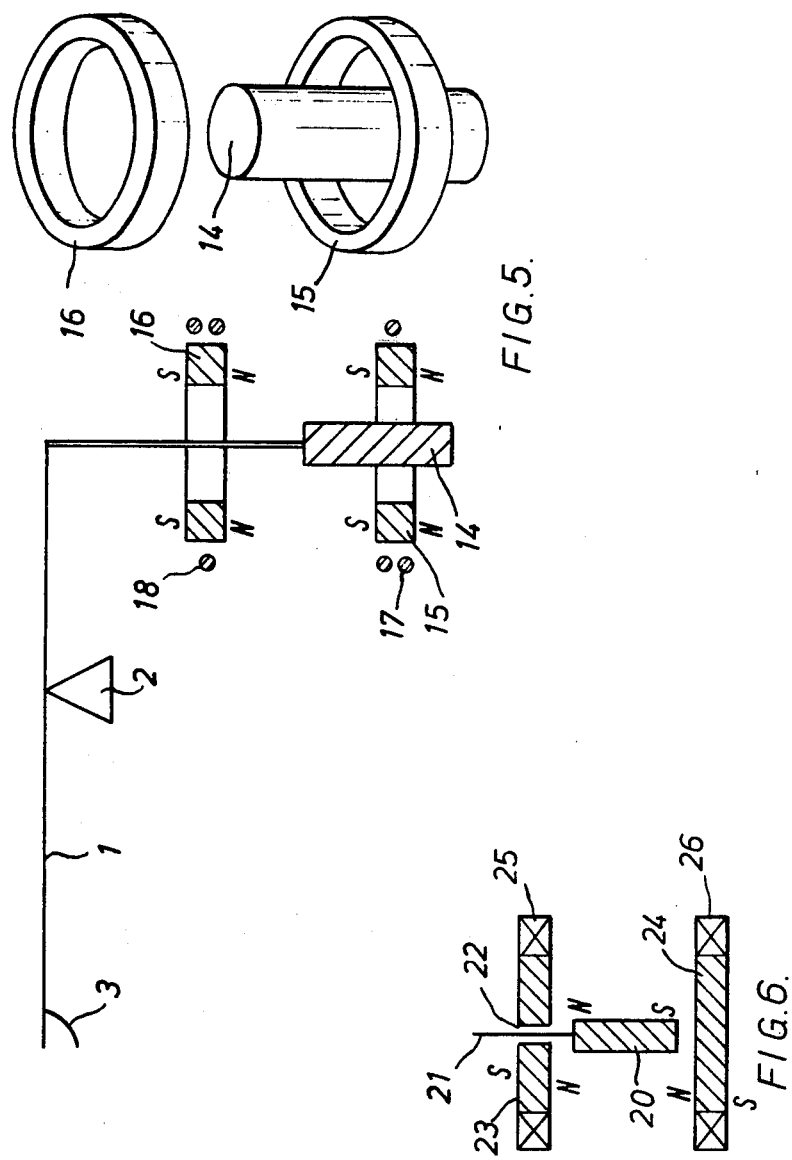

PIVOTED ARM CONTROL ARRANGEMENTS

This invention relates to arrangements for use in controlling the movement of a pivoted arm and it has particular, though not exclusive, application in controlling the movement of a phonograph pick-up arm.

Figure 1:
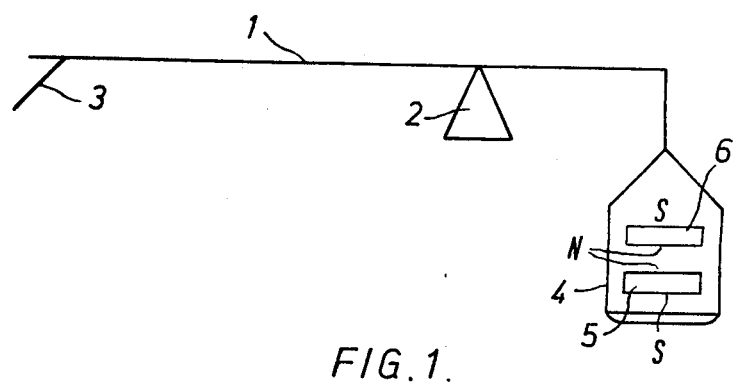
Figure 2:
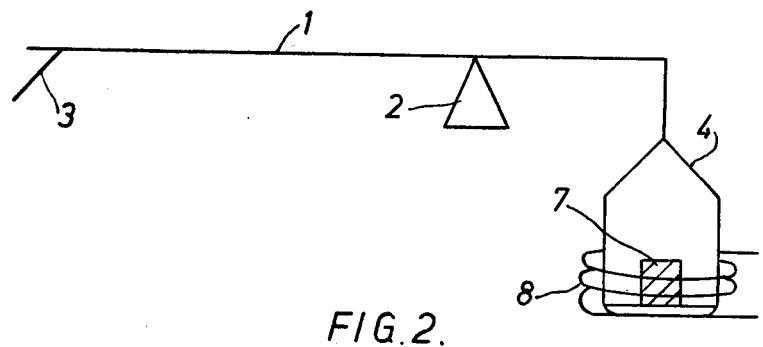
Figure 7:
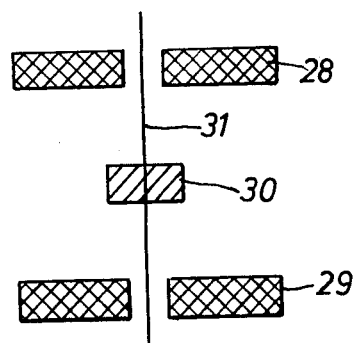
Figure 8:
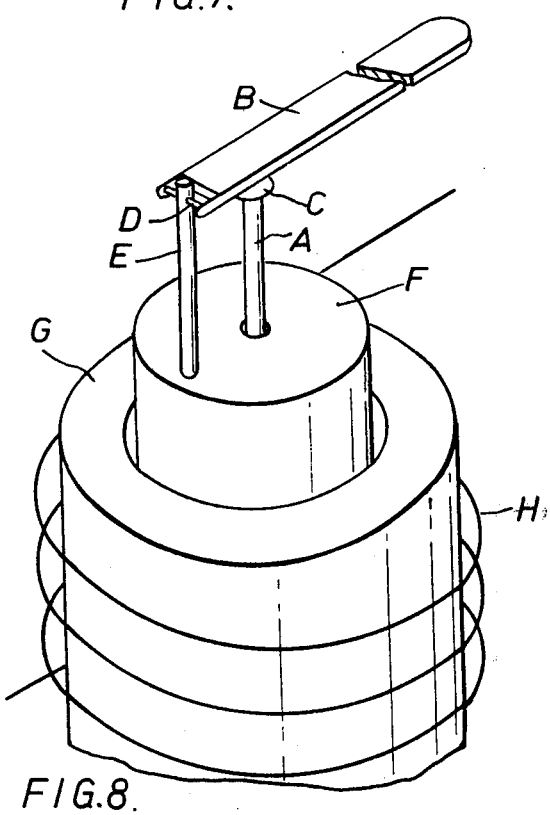

Embodiments of the invention will now be described with reference to the accompanying drawings in which:

FIG. 1 is a diagrammatic illustration of phonograph pick-up arm arrangement,

FIG. 2 is a diagrammatic illustration of another phonograph pick-up arm arrangement, FIGS. 3, 4 and 5 each illustrate diagrammatically and partly in perspective further respective phonograph pick-up arm arrangements, FIG. 6 illustrates diagrammatically at (a) and (b) sectional and perspective views respectively of a coil and magnet arrangement and FIG. 7 is a diagrammatic sectional view of a further coil and magnet arrangement, FIG. 8 is a diagrammatic perspective view of yet another coil and magnet arrangement.

Referring to FIG. 1, a phonograph pick-up arm is indicated diagrammatically by a line 1. The arm 1, which is pivoted about a pivot 2, carries a stylus 3 near to one of its ends. A cradle 4, which carries a permanent magnet ring 5, is suspended from a point near to the other end of the arm 1. A permanent magnet ring 6 is fixedly positioned relative to the magnet 5 in such a way that it repels both the magnet 5 and the cradle 4 in a downwards direction. The pivot 2 moves along a line which is parallel to the line of movement of the stylus 3 across a record during playing.

The effect of the repulsion between the magnets 5 and 6 is to exert a force on the arm 1 which provides a counterbalance to the stylus 3. The distance between the magnets 5 and 6, when the stylus 3 rests upon a record, can be arranged to be such that a required tracking weight of the stylus upon a record is obtained during playing. It is possible to adjust the distance between the magnets 5 and 6 in order to adjust the tracking weight of the stylus, as required. Although the force between two similar ring magnets 5 and 6 varies inversely as the square of the distance between them, it is possible, by suitably shaping and dimensioning the magnets, to arrange that the force of repulsion is substantially linear over a limited operating region, for example over the distance through which the magnet 5 normally travels relative to the magnet 6 during the playing of a record. It is also possible to shape the magnets in such a way that the force between them tends to keep the magnet 5 positioned centrally with respect to the magnet 6. In a modification (not shown), a coil is wound concentrically around the magnet 6 and d.c. current can be passed through the coil in such a direction that the magentic field produced by the coil opposes the field from the magnet 6. Thus, by adjusting the value of the d.c. current passing through the coil, the stylus can be raised or lowered from its operating position by remote control according to the degree of attraction or repulsion between the magnet 5 and the combined fields of the magnet 6 and the coil.

Of course, the force of repulsion between the magnets could be such that, in the absence of current in the coil, the stylus is raised from the playing surface of a record. In such an arrangement the risk of damage to the surface is reduced in the event of a power failure, since, in such a situation, the stylus will be lifted clear of the surface automatically.

Alternatively, the movable magnet 5 can be subjected to an electrically controlled magnetic field from a surrounding coil and the current through the coil controlled as required.

Referring to FIG. 2, there is shown an arrangement in which an arm 1, which is pivoted at 2, carries a stylus 3 at one end and a cradle 4 at the other. The cradle 4 carries a body 7, which can be a permanent magnet or be of soft iron, and a coil 8 is wound around the cradle. In the absence of current passing through the coil 8, the stylus 3 is raised from the surface of a record and the body 7 is lowered below the coil 8. The passage of current through the coil 8 at a gradually increasing rate can be used to attract the body 7 towards the coil and cause the stylus 3 to be lowered gradually on to the surface of the record. Furthermore, the force exerted by the field from the coil 8 upon the body 7, when the arm is lowered with the stylus upon the surface of the record, can be arranged to be such that it provides the required counterbalance to the arm during playing.

Referring to FIG. 3, there is indicated a phonograph pick-up arm 1 which is pivoted at 2 and which carries a stylus 3 at one end and a cylindrical magnet 10 at the other end. A ring magnet 11 surrounds the magent 10 and a coil 12 is wound around the magnet 11.

The poles of the magnets 10 and 11, which are indicated N and S, are so arranged that a force of repulsion occurs between the end face of the magnet 10 remote from the arm 1 and the end face of the magnet 11 nearest to the arm 1 tending to draw the magnet 10 into the hollow core of the magnet 11. The magnitude of this force can be varied by passing a d.c. current through the coil 12 in such a direction that the magnetic field produced thereby opposes the field from the magnet 11 thereby lowering the stylus 3 on to the playing surface. It will be seen that, in the event of power failure and the absence of current in the coil 12, the magent 10 will be drawn into the hollow core of the magnet 11 and that the stylus 3 will be lifted off the playing surface. The geometry and dimensions of the magnets 10 and 11 can be varied to give both a required degree of centering of the magnet 10 within the magnet 11 and linearity in the relationship between the force exerted between the magnets and their relative positions over a given distance so that the tracking weight of the stylus on the playing surface does not vary with small excursions of the stylus and the arm.

In FIG. 4 there is shown an embodiment which is similar to that of FIG. 3, a ring magnet 11a being suspended from the arm 1 and a magnet 10a being surrounded by a coil 13 and movable relative to the magnet 11a which surrounds it. The principle of operation of this embodiment is similar to that of the embodiment of FIG. 3 in that d.c. current is passed through the coil 13 in such a direction that the magnet 11a tends to move away from its position surrounding the magnet 10a and the stylus 3 is lowered on to the playing surface. Again it will be seen that,in the absence of a d.c. current in the coil 13, due for example to a power failure, the stylus 3 is raised from the playing surface. The magnets can, of course, be shaped to give required degrees of centering and linearity, as for the previously described embodiments.

Referring to FIG. 5, there is shown an embodiment in which a cylindrical magnet 14 is suspended from the opposite end of a pick-up arm 1 which is pivoted at 2 to that carrying a stylus 3. The magnet 14 is suspended in a magnetic field created by two ring magnets 15 and 16 in such a way that its pole nearer to the arm 1 is approximately midway between the two magnets 15 and 16 which have a length to diameter ratio of approximately 0.2. Its other pole is well on the side of the magnet 15 remote from the magnet 16. The spacing between the magnets 15 and 16 is arranged to give a substantially linear field gradient in the region midway between them. Coils 17 and 18 are wound around the magnets 15 and 16 respectively.

In operation, d.c. current is passed through the coils 17 and 18 in such a direction that the magnets 15 and 16 are demagnetised. In the absence of current in the coils 17 and 18 the magnet 14 tends to move away from the magnet 16 to a position in which its end nearer to the arm 1 approaches the nearer face of the ring magnet 15 to the arm 1 and the stylus 3 is raised from the playing surface. As demagnetising current is passed through the coils 17 and 18 and increased in value, the magnet 14 moves gradually towards the magnet 16 until the stylus 3 is lowered on to the playing surface. Further increase in the current through the coils 17 and 18 can be used to increase the tracking weight of the stylus 3 on the playing surface to a required degree. Small vertical excursions of the stylus will not result in variations in the tracking weight since the corresponding position of the North pole of the cylindrical magent 14 is midway between the magnets 15 and 16 and the field gradient in this region is linear.

A further arrangement, which is somewhat similar to that shown in FIG. 5, and in which there is a comparatively large region where force is substantially independent of vertical position is shown in FIG. 6. In the arrangement shown in FIG. 6, a cylindrical permanent magnet 20 is suspended by a rod of non-magnetic 21 from the end of a pick-up arm (not shown) in a manner similar to that previously described. The rod 21 passes through a central hole 22 in a disc magnet 23 and the magnet 20 is positioned between the disc magnet 23 and a disc magnet 24. Demagnetising coils 25 and 26 are wound around the disc magnets 23 and 24 respectively and employed in a similar way to the coils 17 and 18 shown in FIG. 5. Thus, with the magnets poled in the way shown in FIG. 6 and no current in the coils 25 and 26, the magnet 20 tends to move towards the disc magnet 24 and away from the disc magnet 23 and the system is so balanced that the stylus is raised from the playing surface. The passage of current through either or both of the coils 25 and 26, in such a direction as to tend to demagnetise its respective disc magnet, reduces the magnetic forces between the magnet 20 and the disc magnets 23 and 24. The current can be so proportioned that the stylus on the pick-up arm is lowered on to the playing surface gently and with a required degree of pressure on the surface. It will be understood that the magnet system can be arranged, in the absence of the demagnetising current, to give either an upward thrust or a downward thrust, simply by inverting the magnet 20. It is possible to arrange the magnet system on either side of the pivot for the pick-up arm according to the direction of thrust.

A further embodiment is shown diagrammatically in FIG. 7 in which two pancake coils 28 and 29 are arranged, one on each side of a permanent magnet 30 which is suspended from a pick-up arm by a non-magnetic rod 31 passing through central holes in the coils 28 and 29. The coils 28 and 29 are arranged and connected in such a way that current can be passed through them to produce magnetic fields in the region close to the magnet 30 which tend to cancel one another. Independent variation of the currents in the two coils 28 and 29 can be used to control the variation of the magnetic field gradient in the region of the magnet 30 and hence the force acting upon the magnet causing it to tend to move towards one or the other of the coils 28 and 29. Automatic lift off of a stylus from a playing surface can be accomplished either by mechanically balancing the pick-up arm off the surface or by the use of a small magnet adjacent to the coils in order to provide a weak magnetic field to magnetically bias the stylus off the playing surface.

By the suitable choice of a magnet, the field can be arranged to lift the stylus gently off the playing surface at the instant of power failure followed by a more rapid lift to the fully up position.

The particular embodiments so far described relate to the control of an arm whose pivot is mounted upon a parallel tracking carriage.

An embodiment of the invention will now be described, with reference to FIG. 8, in which the position of the pivot point of a stylus arm does not move during the playing of a record. In FIG. 8, there is shown a rod A upon which a pick-up arm B is pivoted by means of a ball and socket joint C. At the opposite end of the arm to that carrying the stylus, there is a hinge D, by means of which a rigid rod E, which is fixed to a cylindrical magnet F, is coupled to the arm B. The cylindrical magnet F is able to slide up and down the relatively fixed rod A. The cylindrical magnet F is also able to slide in and out of a further cylindrical magnet G under the influence of variations in a demagnetising current passing through a coil H surrounding the magnet G.

In operation, the arm B can thus be raised or lowered as a result of variations in the current passing through the coil H causing the magnet F and the rod E to be raised lowered and the stylus end of the arm B to be correspondingly lowered and raised as the arm B pivots about the relatively fixed ball and socket pivot point C. It is also possible for the arm B to rotate about the longitudinal axis of the rod A during tracking of the stylus over a record and to cause a corresponding rotation of the magnet F, through the intermediate rod E, about the longitudinal axis of the rod A.

Thus, the vertical movement of the magent F along the rod A under the influence of the combined fields of the magnet G and the coil H could be used to control the raising and lowering of the arm B, as well as the tracking force, while the magnet F was able to swivel with the arm B about the rod A to enable the stylus on the pick-up arm B to track along the groove of a record, in the conventional manner.

It will be understood that, although the invention has been described with reference to particular embodiments, variations and modifications can be made within the scope of the invention. For example, although the embodiments described show an arm which is pivoted at a point intermediate its ends, the invention could be applied to control the movement of an arm in the form of a bar that is supported in some other way, for example by a compliant suspension that allows parallel movement of the whole length of the bar by the same amount in one direction, for example vertically. It will also be appreciated that the reaction between the two relatively movable parts of the control device can be controlled by varying the current through one of the control coils, by shaping the body of magnetic material and the magnetic field producing means which are relatively movable to one another, for example by tapering one with respect to the other about their common axis, or by a combination of the two, so that relative movement is produced according to a required law. Thus the square law reaction of the simple embodiment of FIG. 1 could be modified by making the magnet 6 a conically tapered magnet and the magnet 5 a ring magnet so arranged that, during relative movement between the two magnets, the smaller diameter end of the magnet 6 tends to enter the aperture in the ring magnet 5 and the movement is controlled in accordance with a predetermined law.

We claim:

1. In a phonograph having a pivoted pickup arm, apparatus for use in controlling the movement of the arm about a pivot point including first magnetic field producing means coupled to the arm, second magnetic field producing means arranged to produce a magnetic field which acts upon the first magnetic field producing means to produce rotation of the arm about the pivot point and means to produce a third magnetic field, the third magnetic field being arranged to modify the effect of the second magnetic field producing means upon the first magnetic field producing means, thereby to modify the said rotation of the arm.

2. Apparatus according to claim 1 wherein the said first and second magnetic field producing means are each constituted by a respective permanent magnet and the third magnetic field producing means is constituted by a coil.

3. Apparatus according to claim 1 wherein the first magnetic field producing means is constituted by a permanent magnet, the second magnetic field producing means is constituted by a pair of permanent magnets and the third magnetic field producing means is constituted by a pair of coils, each of the pair of coils being associated with a respective one of the said pair of permanent magnets.

4. Apparatus according to claim 1 wherein the first magnetic field producing means is a permanent magnet and the second and third magnetic field producing means are each constituted by a respective coil.

5. Apparatus according to claim 2 including a cylindrical magnet constituting the permanent magnet providing the first magnetic field producing means and a ring magnet surrouding the cylindrical magnet, the said ring magnet constituting the permanent magnet providing the second field producing means.

6. Apparatus according to claimm 3 including a cylindrical magnet constituting the permanent magnet providing the first magnetic field producing means, and a pair of ring magnets each surrounding the cylindrical magent, the said ring magnets each constituting one of the said pair of permanent magnets.

7. Apparatus according to claim 4 including a pair of pancake coils constituting the second and third field producing means, one of the said pancake coils being on one side of the permanent magnet, the other of the said coils being on the other side of the permanent magnet and both of the said pancake coils being arranged about an axis on which the magnet moves to produce rotation of the arm.

* * * * *